US012763407B2

(12) United States Patent
Ryu et al.

(10) Patent No.: US 12,763,407 B2
(45) Date of Patent: Oct. 13, 2026

(54) BATTERY MODULE, BATTERY PACK COMPRISING THE SAME AND VEHICLE

(71) Applicant: LG ENERGY SOLUTION, LTD., Seoul (KR)

(72) Inventors: Sang-Woo Ryu, Daejeon (KR); Jee-Soon Choi, Daejeon (KR); Dal-Mo Kang, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 855 days.

(21) Appl. No.: 17/767,669

(22) PCT Filed: May 7, 2021

(86) PCT No.: PCT/KR2021/005769
§ 371 (c)(1),
(2) Date: Apr. 8, 2022

(87) PCT Pub. No.: WO2021/235751
PCT Pub. Date: Nov. 25, 2021

(65) Prior Publication Data

US 2024/0106037 A1 Mar. 28, 2024

(30) Foreign Application Priority Data

May 22, 2020 (KR) ........................ 10-2020-0061866

(51) Int. Cl.
*H01M 50/143* (2021.01)
*H01M 50/211* (2021.01)
*H01M 50/375* (2021.01)

(52) U.S. Cl.
CPC ....... *H01M 50/143* (2021.01); *H01M 50/211* (2021.01); *H01M 50/375* (2021.01); *H01M 2220/20* (2013.01)

(58) Field of Classification Search
CPC ...... H01M 50/20; H01M 50/30; H01M 50/35; H01M 50/143; H01M 50/211;
(Continued)

(56) References Cited

U.S. PATENT DOCUMENTS 5,643,691 A * 7/1997 Iwatsuki ............. H01M 50/383 429/61
5,736,836 A 4/1998 Hasegawa et al.
(Continued)

FOREIGN PATENT DOCUMENTS

CN 1670987 A 9/2005
CN 201608218 U 7/2026
(Continued)

OTHER PUBLICATIONS

JP2001110377A, Kimoto, et al. “Battery pack”, machine English translation retrieved from https://worldwide.espacenet.com/ Date: Nov. 27, 2024 (Year: 2001).*
(Continued)

*Primary Examiner* — Tiffany Legette
*Assistant Examiner* — Jared Hansen
(74) *Attorney, Agent, or Firm* — Birch, Stewart, Kolasch & Birch, LLP

(57) ABSTRACT

A battery module includes at least one cell assembly including a plurality of secondary batteries, a gas pipe configured to allow gas produced in a module housing to move therein, and the module housing including a lower case having one open side and an internal space in which the at least one cell assembly is received, and an upper case coupled to one side of the lower case to cover the one open side of the lower case and having a receiving space in which the gas pipe is received, and a connection hole to which one end of the gas pipe is connected such that the gas pipe and the internal space are in communication with each other.

15 Claims, 14 Drawing Sheets

(58) Field of Classification Search
CPC ............. H01M 50/271; H01M 50/308; H01M 50/317; H01M 50/358; H01M 50/375; H01M 50/394; H01M 2200/00; H01M 2220/20; Y02E 60/10
See application file for complete search history.

(56) References Cited

U.S. PATENT DOCUMENTS

| | | | | | |
|---|---|---|---|---|---|
| 5,954,345 | A | * | 9/1999 | Svoboda | F16H 57/029 277/606 |
| 6,278,259 | B1 | * | 8/2001 | Kimoto | H01M 50/358 320/147 |
| 2009/0181288 | A1 | | 7/2009 | Sato | |
| 2010/0052692 | A1 | | 3/2010 | Yano et al. | |
| 2010/0178552 | A1 | | 7/2010 | Kim et al. | |
| 2012/0094157 | A1 | | 4/2012 | Seto | |
| 2012/0164490 | A1 | | 6/2012 | Itoi et al. | |
| 2013/0330579 | A1 | * | 12/2013 | Ejiri | H01M 50/30 429/53 |
| 2014/0205878 | A1 | | 7/2014 | Ohgitani et al. | |
| 2016/0322617 | A1 | * | 11/2016 | Bae | H01M 50/30 |
| 2019/0173074 | A1 | | 6/2019 | Ogawa et al. | |

FOREIGN PATENT DOCUMENTS

| | | | | | |
|---|---|---|---|---|---|
| JP | 9-283106 | A | | 10/1997 | |
| JP | 2001110377 | A | * | 4/2001 | H01M 2/1252 |
| JP | 2002008603 | A | * | 1/2002 | |
| JP | 2007-157633 | A | | 6/2007 | |
| JP | 2009-164085 | A | | 7/2009 | |
| JP | 2010-56035 | A | | 3/2010 | |
| JP | 2010-282854 | A | | 12/2010 | |
| JP | 2012-84422 | A | | 4/2012 | |
| JP | 2014-139895 | A | | 7/2014 | |
| JP | 2019-102421 | A | | 6/2019 | |
| KR | 10-0353948 | B1 | | 9/2002 | |
| KR | 10-2008-0041447 | A | | 5/2008 | |
| KR | 10-2012-0090027 | A | | 8/2012 | |
| KR | 20160081394 | A | * | 7/2016 | H01M 50/30 |
| KR | 10-2017-0090261 | A | | 8/2017 | |

OTHER PUBLICATIONS

KR20170090261A, Jeong, et al. "Case for Secondary Battery Pack and Secondary Battery Pack including the same", machine English translation retrieved from https://worldwide.espacenet.com/ Date: May 29, 2025 (Year: 2017).*

JP2002008603A, Shukutani, et al. "Power Supply", machine English translation retrieved from https://worldwide.espacenet.com/ Date: Jan. 11, 2026 (Year: 2002).*

KR20160081394A, Kim, et al. "Apparatus for collecting inner gas in secondary electric cell", machine English translation retrieved from https://worldwide.espacenet.com/ Date: Jan. 11, 2026 (Year: 2016).*

Extended European Search Report for European Application No. 21807642.0, dated Jun. 19, 2023.

International Search Report (PCT/ISA/210) issued in PCT/KR2021/005769 mailed on Aug. 24, 2021.

* cited by examiner

200C

BATTERY MODULE, BATTERY PACK COMPRISING THE SAME AND VEHICLE

TECHNICAL FIELD

The present disclosure relates to a battery module, a battery pack comprising the same and a vehicle, and more particularly, to a battery module with improved safety against fires or explosions.

The present application claims the benefit of Korean Patent Application No. 10-2020-0061866 filed on May 22, 2020 with the Korean Intellectual Property Office, the disclosure of which is incorporated herein by reference in its entirety.

BACKGROUND ART

Recently, with the rapid increase in demand for portable electronic products such as laptop computers, video cameras and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material as a positive electrode active material and a negative electrode active material respectively. Additionally, the lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery case in which the electrode assembly is hermetically received together with an electrolyte solution.

Additionally, lithium secondary batteries may be classified into can-type secondary batteries including the electrode assembly embedded in a metal can and pouch-type secondary batteries including the electrode assembly embedded in a pouch of an aluminum laminate sheet according to the shape of the packaging.

In particular, more recently, large capacity battery modules applied to electric vehicles are increasing in demand.

However, the large capacity battery module includes a plurality of secondary batteries, and when fires or explosions occur in the plurality of secondary batteries, the fires are likely to spread to the adjacent other battery module due to flames and high temperature gas emission. As a result, fire propagation may cause great financial damage.

Additionally, when fires or explosions occur in the plurality of secondary batteries of the large capacity battery module, adjacent other devices are damaged or loss of human life occurs due to high temperature gas and flames released from the battery module at the time of the explosions. Accordingly, it is necessary to increase the safety against fires or gas explosions of the battery module.

DISCLOSURE

Technical Problem

The present disclosure is designed to solve the above-described problem, and therefore the present disclosure is directed to providing a battery module with improved safety against fires or gas explosions.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery module according to the present disclosure includes at least one cell assembly including a plurality of secondary batteries, a gas pipe configured to allow produced gas to move, and a module housing including a lower case having one open side and an internal space in which the at least one cell assembly is received, and an upper case coupled to one side of the lower case to cover the one open side of the lower case and having a receiving space in which the gas pipe is received, and a connection hole to which a first end of the gas pipe is connected such that the gas pipe and the internal space are in communication with each other.

Additionally, the gas pipe may include at least one connecting unit-connector having a pipe shape extending in a vertical direction, and configured to be connected with the connection hole, and a pipe which extends in a horizontal direction and has an end connected with the connector.

Furthermore, the connector may include an open insertion hole into which that the end of the pipe is inserted, and a sealing member configured to open the insertion hole when the pipe is inserted into the insertion hole, and close the insertion hole when the pipe is not inserted into the insertion hole.

Additionally, the sealing member may include at least two sealing portions disposed in the insertion hole, the at least two sealing portions may be configured to come into contact with each other to close the insertion hole when the pipe unit is not inserted into the insertion hole, and the at least two sealing portions may be configured to spread apart to open the insertion hole when the end of the pipe unit is inserted.

Additionally, the upper case may have one open side of the receiving space, and the battery module may further include a top plate coupled with the upper case to cover the open side of the receiving space of the upper case, and having an outlet connected with the other end of the gas pipe to release gas to outside.

Furthermore, the upper case may include a first fixing groove recessed in an inward direction, into which one end of the connector in the vertical direction is inserted, and the top plate may include a second fixing groove recessed in the inward direction, into which a second end of the connector in the vertical direction is inserted.

Additionally, the gas pipe may be configured to have an adjustable length according to gas explosive power of the at least one cell assembly.

Additionally, the gas pipe may include a plurality of interruption protrusions configured to interrupt movement of gas in a movement space in which the gas moves.

Further, to achieve the above-described object, a battery pack according to the present disclosure includes at least one battery module.

Additionally, to achieve the above-described object, a vehicle according to the present disclosure includes at least one battery pack.

Advantageous Effects

According to an aspect of the present disclosure, the present disclosure includes the gas pipe and the upper case having the internal space in communication with the gas pipe, to cause flames or gas produced by fires or explosions of the internal components such as the cell assembly to move through the gas pipe disposed in the receiving space. Accordingly, the present disclosure may cause flames to move in the gas pipe while preventing flames from being directly released out of the battery module. Further, the present disclosure may release gas to the outside after reducing gas explosive power with the movement of gas along the gas pipe in the event of gas explosions of the plurality of secondary batteries.

Further, according to an aspect of the present disclosure, the present disclosure includes the at least one connecting unit and the pipe unit, so it is easy to assemble with the length set according to the gas explosive power of the gas pipe. Further, it is possible to adjust the extension direction of the gas pipe according to the location at which gas of the battery module is released to the outside, and thus it is possible to manufacture the gas pipe of various shapes (lengths) by assembling the plurality of existing connecting units and the plurality of existing pipe units without needing to manufacture a new type of gas pipe.

BRIEF DESCRIPTION OF THE DRAWINGS

The accompanying drawings illustrate the preferred embodiments of the present disclosure, and together with the following detailed description, serve to provide a further understanding of the technical aspect of the present disclosure. However, the present disclosure should not be construed as being limited to the drawings.

DETAILED DESCRIPTION

Figure 1:
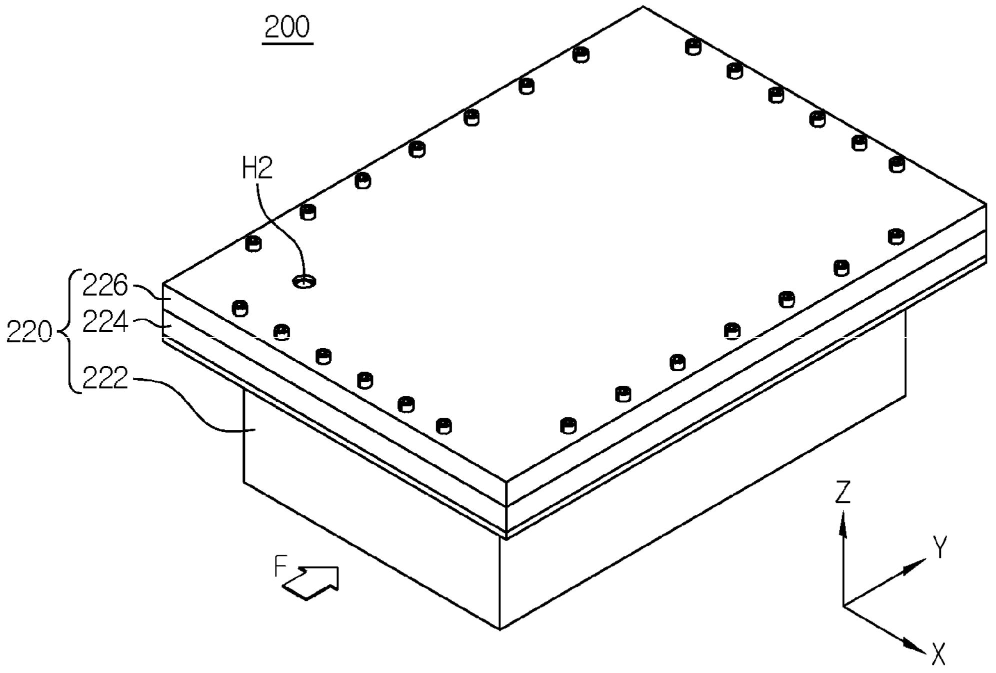
FIG. 1 is a schematic perspective view of a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
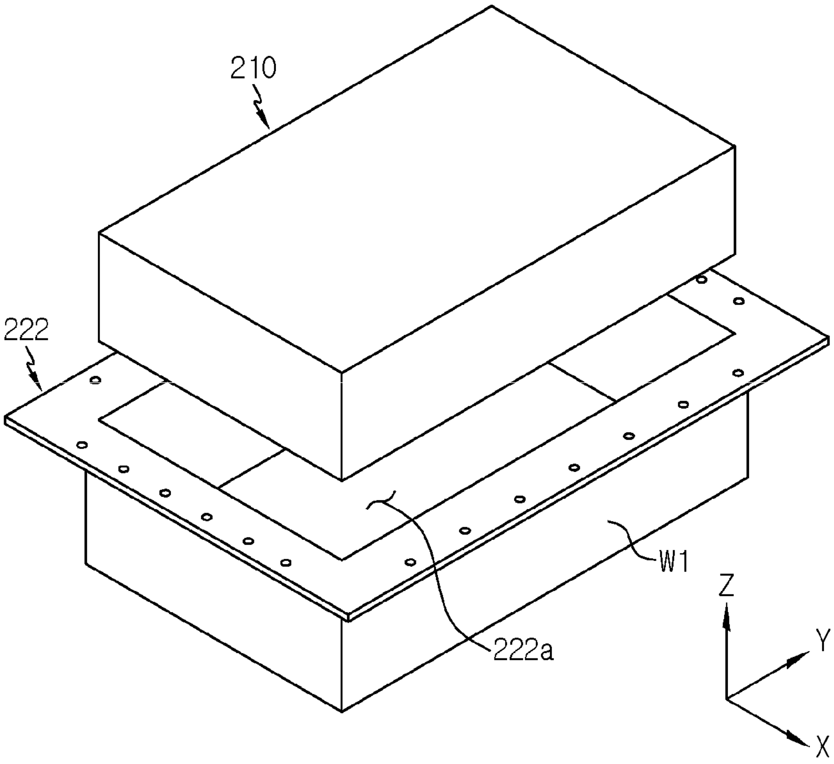
FIG. 2 is a schematic exploded perspective view of components of a battery module according to an embodiment of the present disclosure.
Figure 3:
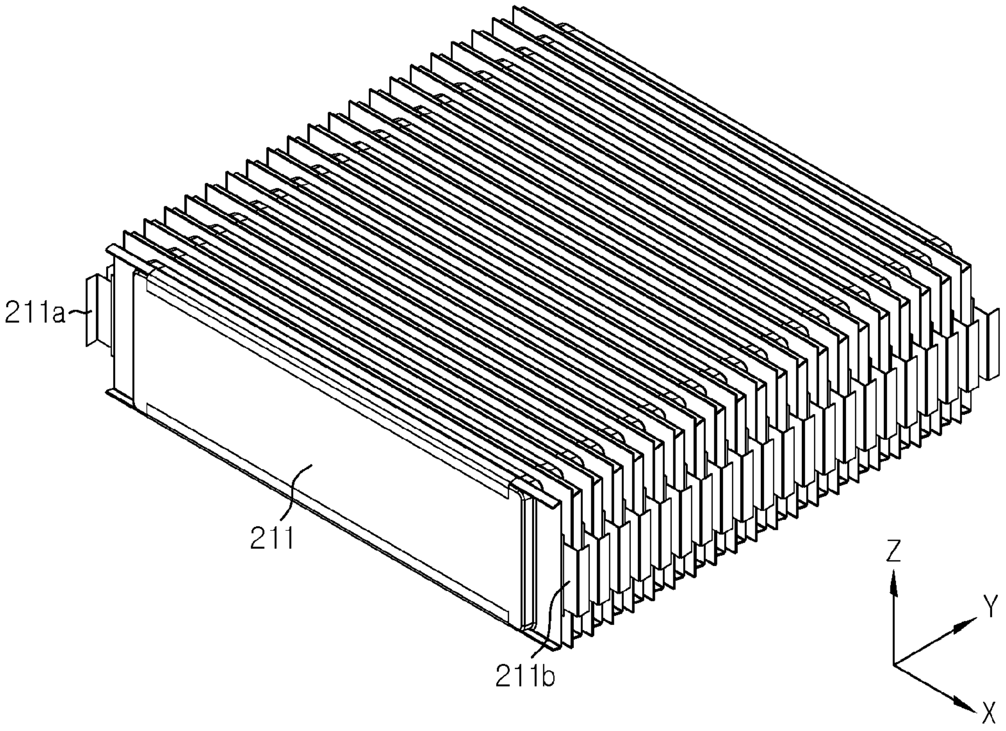
FIG. 3 is a schematic perspective view of a plurality of secondary batteries of a battery module according to an embodiment of the present disclosure.

FIG. 1 is a schematic perspective view of a battery module according to an embodiment of the present disclosure. FIG. 2 is a schematic exploded perspective view of the components of the battery module according to an embodiment of the present disclosure. Additionally, FIG. 3 is a schematic perspective view of a plurality of secondary batteries of the battery module according to an embodiment of the present disclosure. In FIG. 1, the X axis direction is the right direction, the Y axis direction is the rear direction, and the Z axis direction is the up direction.

Referring to FIGS. 1 to 3, the battery module 200 of the present disclosure includes a cell assembly 210, a gas pipe 230 and a module housing 220.

Specifically, the cell assembly 210 may include a plurality of secondary batteries 211. The secondary battery 211 may be a pouch-type secondary battery. For example, as shown in FIG. 3, the cell assembly 210 may include 21 pouch-type secondary batteries 211 stacked side by side in a direction (Y axis direction) within a case.

Further, as shown in FIG. 3, the positive electrode lead **211*a* and the negative electrode lead 211*b* may be formed at two ends with regard to the center of a pouch 116 of the secondary battery 211. That is, the positive electrode lead 211*a* may be provided at one end with regard to the center of the secondary battery 211. Additionally, the negative electrode lead 211*b* may be provided at the other end with regard to the center of the secondary battery 211**.

However, in the battery module 200 according to the present disclosure, the configuration of the secondary battery is not limited to the above-described pouch-type secondary battery 211 and various types of secondary batteries 211 known at the time of filing the patent application may be employed.

Additionally, the battery module 200 may include at least one busbar (not shown) configured to electrically connect the plurality of secondary batteries 211. Specifically, the busbar may include a conductive metal, for example, copper, aluminum and nickel.

Figure 4:
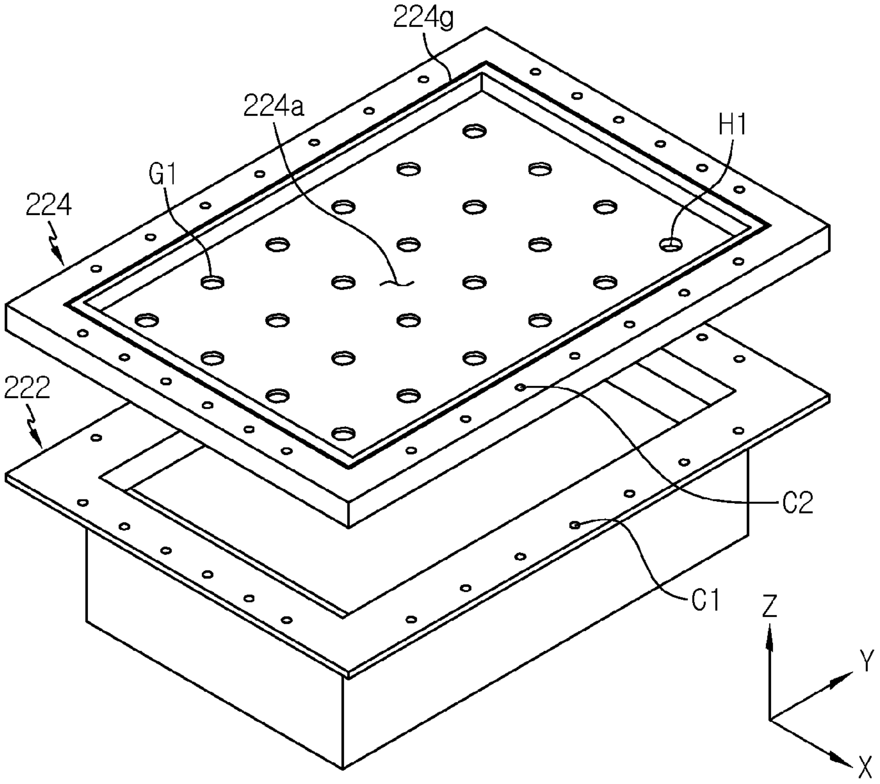
FIG. 4 is a schematic exploded perspective view of components of a battery module according to an embodiment of the present disclosure.

FIG. 4 is a schematic exploded perspective view of the components of the battery module according to an embodiment of the present disclosure. Additionally, FIG. 5 is a schematic perspective view of the components of the battery module 200 according to an embodiment of the present disclosure.

Figure 5:
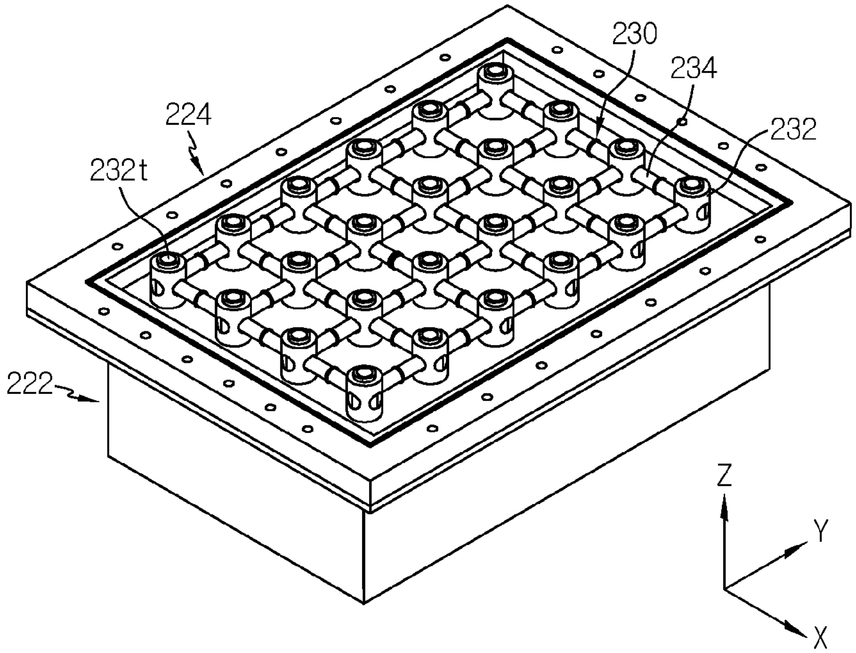
FIG. 5 is a schematic perspective view of components of a battery module according to an embodiment of the present disclosure.

Referring to FIGS. 4 and 5 together with FIGS. 2 and 3, the gas pipe 230 may be configured to allow gas produced in the module housing 220 to move therein. That is, the gas pipe 230 may be in the shape of a pipe that extends in a direction in which gas moves. The gas pipe 230 may include a metal or plastic material.

Additionally, the module housing 220 may include a metal or plastic material. The module housing 220 may include a lower case 222 and an upper case 224. The lower case 222 may have an internal space **222*a* in which the at least one cell assembly 210 is received. That is, the lower case 222 may have walls W1 that form the internal space 222*a* that is equal to or larger than the volume of the cell assembly 210. The internal space 222*a*** may have one open side.

Furthermore, the upper case 224 may be configured to cover the open side of the lower case 222. That is, the upper case 224 may have a wider area than the open area of the lower case 222. For example, the upper case 224 may have a plate shape extending in a horizontal direction (X axis direction and Y axis direction). The upper case 224 may be coupled to one side of the lower case 222. Here, the horizontal direction refers to a direction parallel to the ground when the battery module 200 is placed on the ground.

Additionally, the upper case 224 may have a receiving space **224*a* in which at least part of the gas pipe 230 is received. That is, the receiving space 224*a* may be a space that is recessed in the downward direction at the central area of the upper case 224. The receiving space 224*a* may have a size that is large enough to accommodate at least part of the gas pipe 230**.

Further, the upper case 224 may include a connection hole H1 to allow the gas pipe 230 and the internal space **222*a* of the lower case 222 to be in communication with each other. Accordingly, one end of the gas pipe 230 may be connected to the connection hole H1. The gas fed into one end of the gas pipe 230 may move in the horizontal direction along the pipe to the other end (the end, 232*t*) of the gas pipe 230**.

According to this configuration of the present disclosure, the present disclosure includes the upper case 224 configured such that the gas pipe 230 and the internal space **222*a* of the lower case 222 are in communication with each other, to cause flames and gas produced by fires or explosions of the internal components such as the cell assembly 210 to move through the gas pipe 230 disposed in the receiving space 224*a*. Accordingly, the present disclosure may cause flames to move in the gas pipe 230 while preventing flames from being immediately released out of the battery module 200. Further, the present disclosure may release gas to the outside after reducing the gas explosive power with the movement of gas along the gas pipe 230 in the event of gas explosions of the plurality of secondary batteries 211**.

In conclusion, when comparing with the case in which gas and flames produced by fires or explosions of the internal components such as the cell assembly 210 are directly released, the present disclosure may prevent the fire propagation to the adjacent other battery module 200 or other external components and reduce damage to the adjacent external components of the battery module 200 in the event of explosions of the plurality of secondary batteries 211.

Figure 6:
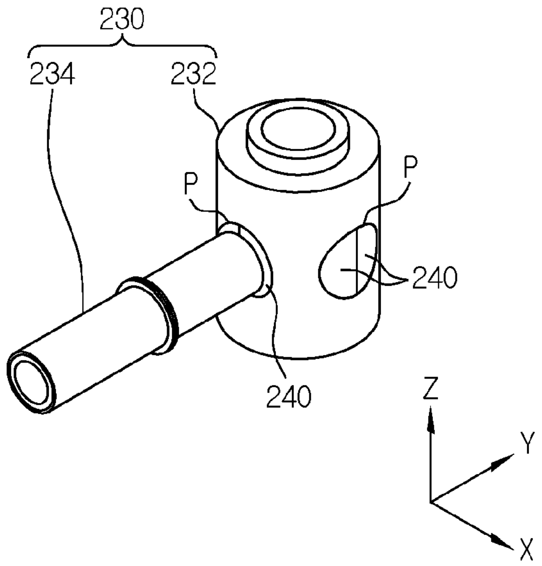
FIG. 6 is a schematic partial perspective view of a gas pipe of a battery module according to an embodiment of the present disclosure.
Figure 7:
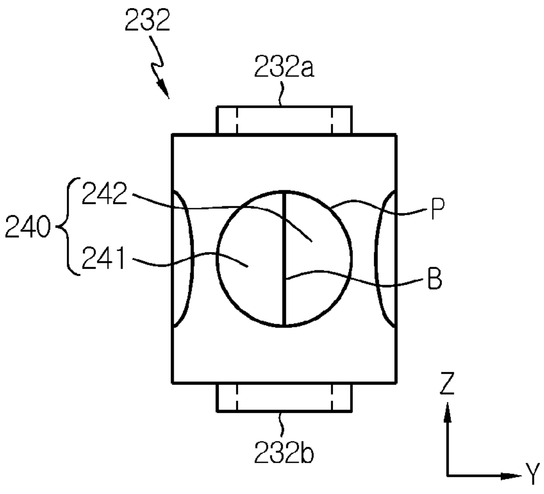
FIG. 7 is a schematic side view of components of a gas pipe of a battery module according to an embodiment of the present disclosure.
Figure 8:
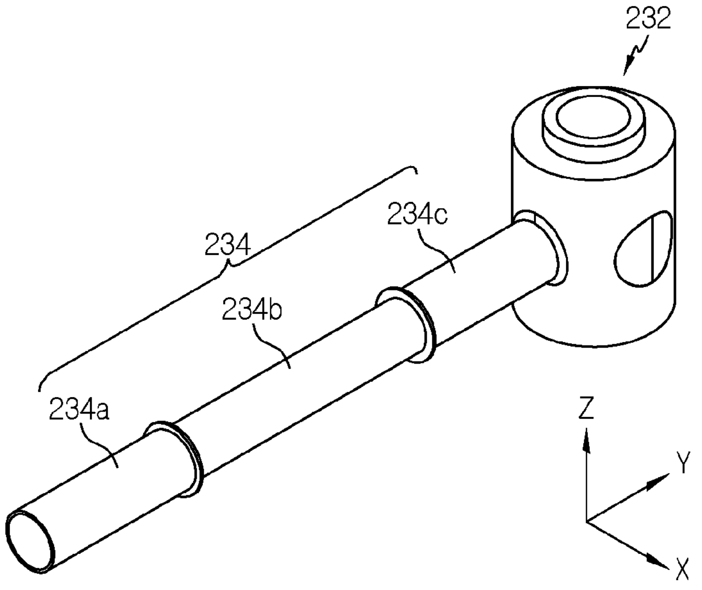
FIG. 8 is a schematic partial perspective view of a gas pipe of a battery module according to an embodiment of the present disclosure.

FIG. 6 is a schematic partial perspective view of the gas pipe of the battery module according to an embodiment of the present disclosure. FIG. 7 is a schematic side view of the components of the gas pipe of the battery module according to an embodiment of the present disclosure. Additionally, FIG. 8 is a schematic partial perspective view of the gas pipe of the battery module according to an embodiment of the present disclosure.

Referring to FIGS. 5 to 8 together with FIG. 4, the gas pipe 230 of the present disclosure may include at least one connecting unit 232 and at least one pipe unit 234. Specifically, the connecting unit 232 may have a pipe shape that extends in the vertical direction. The connecting unit 232 may have an open top **232*a* or bottom 232*b* of the vertically extending pipe, or closed top 232*a* and bottom 232*b*. The connecting unit 232 may be configured to be connected with the connection hole H1. For example, the open bottom 232*b* of the connecting unit 232 may be connected to the connection hole H1 provided in the upper case 224. A part of the open bottom 232*b* of the connecting unit 232 may be inserted into the connection hole H1. Further, for example, as shown in FIG. 1, the open top 232*a* of the connecting unit 232 may be connected with an outlet H2 of a top plate 226. Additionally, the open top 232*a* and the open bottom 232*b* of the remaining connecting unit 232 not connected with the connection hole H1 and the outlet H2** may be closed.

Additionally, the pipe unit 234 may extend in the horizontal direction. The end of the pipe unit 234 may be connected with the connecting unit 232 such that it is in communication with the inside of the connecting unit 232. For example, the connecting unit 232 may have an open insertion hole P into which the end of the pipe unit 234 is inserted.

For example, as shown in FIG. 5, the connecting unit 232 may have the insertion hole P in each of the left side, the right side, the front side and the rear side (four directions). That is, the connecting unit 232 may be connected with 4 pipe units 234 through the 4 insertion holes P.

According to this configuration of the present disclosure, the present disclosure includes the at least one connecting unit 232 and the pipe unit 234, so it is easy to assemble with the length set according to the gas explosive power of the gas pipe 230. Further, it is possible to adjust the extension direction of the gas pipe 230 according to the location at which gas of the battery module 200 is released to the outside, and thus it is possible to manufacture the gas pipe 230 of various shapes (lengths) by assembling the plurality of existing connecting units 232 and the plurality of existing pipe units 234 without needing to manufacture a new type of gas pipe 230.

Further, the connecting unit 232 may serve as a hub for assembly with the pipe unit 234, and when the top **232*a* and/or the bottom 232*b* are closed, serve to disperse the explosive power of gas fed into the connecting unit 232** in the vertical direction, thereby reducing the explosive power.

Additionally, the connecting unit 232 may include a sealing member 240. When the pipe unit 234 is inserted into the insertion hole P, the sealing member 240 may be configured to open the insertion hole P to allow the pipe unit 234 to be inserted. For example, the sealing member 240 may include an elastic material. The elastic material may be, for example, natural rubber, synthetic rubber or silicone rubber.

Additionally, the sealing member 240 may include at least two sealing portions 241, 242 disposed in the insertion hole P. For example, the sealing member 240 may include a first sealing portion 241 and a second sealing portion 242. The at least two sealing portions 241, 242 may be configured to spread apart to open the insertion hole P when the end of the pipe unit 234 is inserted.

For example, at least part of the first sealing portion 241 and the second sealing portion 242 may be separated. Each of the first sealing portion 241 and the second sealing portion 242 may be joined to the circumference of the insertion hole P. For example, the sealing member 240 may be in the shape of a circular plate. The periphery of the circular plate may be attached to the inner side of the insertion hole P of the connecting unit 232 using an adhesive (for example, a sealant).

Further, each of the first sealing portion 241 and the second sealing portion 242 of the sealing member 240 may have a circular shape, and a central area B at which the first sealing portion 241 and the second sealing portion 242 are in close contact with each other may be separated. For example, as shown in FIGS. 6 and 7, the end of the pipe unit 234 may be inserted into the insertion hole P of the connecting unit 232 through the separated area between the first sealing portion 241 and the second sealing portion 242. The sealing member 240 may play a role in preventing the end of the pipe unit 234 inserted into the insertion hole P from being separated again.

Additionally, the sealing member 240 compressed by the inserted pipe unit 234 may be restored to the original state by the elastic force and press the end of the pipe unit 234. In this instance, great friction is exerted between the sealing member 240 and the pipe unit 234, thereby preventing the pipe unit 234 from being separated from the insertion hole P.

Furthermore, the sealing member 240 may be configured to form a seal between the insertion hole P of the connecting unit 232 and the end of the pipe unit 234 to prevent gas leaks between the insertion hole P of the connecting unit 232 and the end of the pipe unit 234.

Additionally, the sealing member 240 may be configured to close the insertion hole P when the pipe unit 234 is not inserted into the insertion hole P. That is, the at least two sealing portions 241, 242 may be configured to come into close contact to close the insertion hole P when the pipe unit 234 is not inserted into the insertion hole P. For example, as shown in FIG. 7, when the pipe unit 234 is not inserted into the insertion hole P, the first sealing portion 241 and the second sealing portion 242 of the sealing member 240 may cover the insertion hole P.

According to this configuration of the present disclosure, the present disclosure includes the sealing member 240, which facilitates the assembly process between the pipe unit 234 and the connecting unit 232, thereby increasing the fabrication efficiency. Further, it is possible to prevent gas moving in the gas pipe 230 from leaking in the gap between the connecting unit 232 and the pipe unit 234, thereby achieving smooth gas release.

Figure 9:
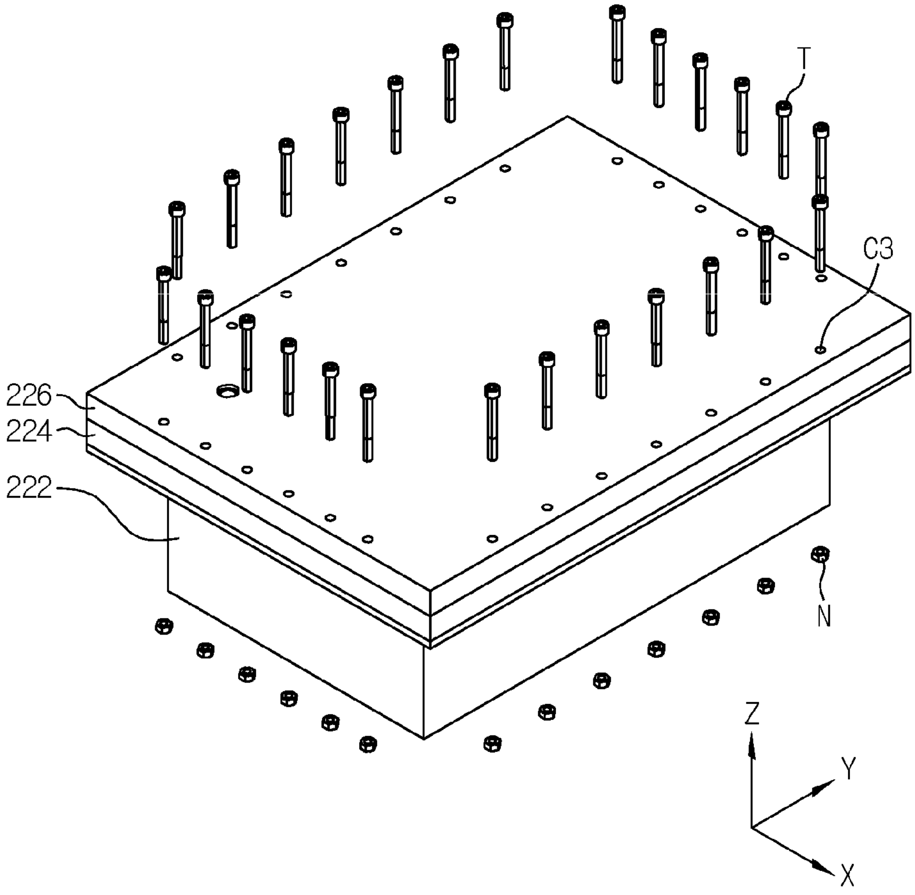
FIG. 9 is a schematic exploded perspective view of assembled components of a battery module according to an embodiment of the present disclosure.

FIG. 9 is a schematic exploded perspective view of the assembled components of the battery module according to an embodiment of the present disclosure. Additionally, FIG. 10 is a schematic bottom perspective view of the top plate of the battery module according to an embodiment of the present disclosure.

Figure 10:
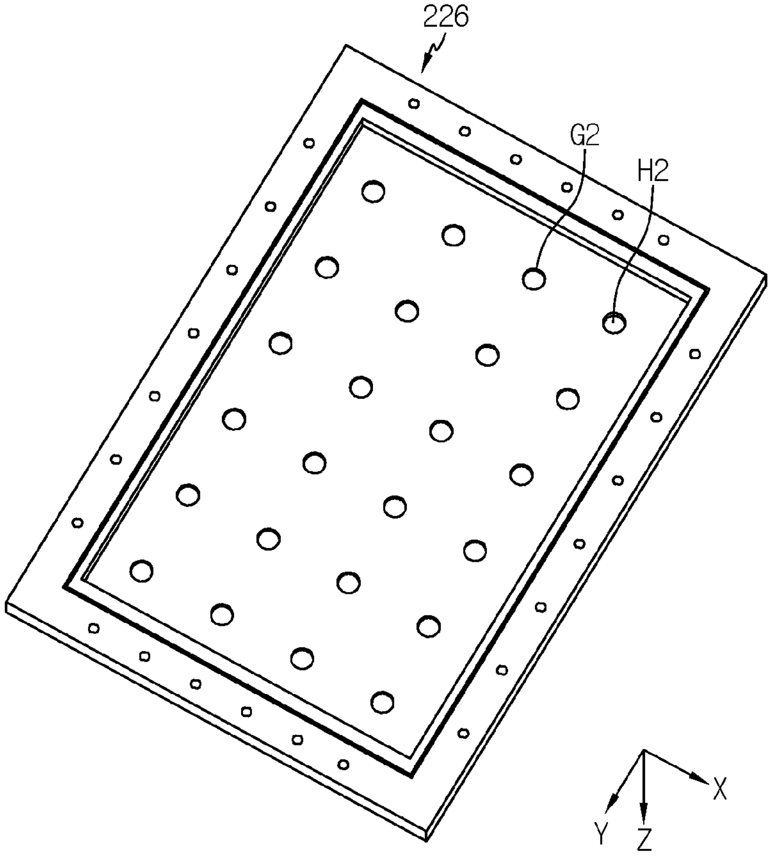
FIG. 10 is a schematic bottom perspective view of a top plate of a battery module according to an embodiment of the present disclosure.

Meanwhile, referring to FIGS. 9 and 10 together with FIG. 4, the battery module 200 of the present disclosure may further include the top plate 226. The upper case 224 may have one open side of the receiving space **224*a*. The top plate 226 may be configured to cover the open side of the receiving space 224*a* of the upper case 224. The upper case 224 may include a gasket 224*g* between the top plate 226 and the upper case 224. The gasket 224*g* may be configured to prevent gas from leaking in the gap between the top plate 226 and the upper case 224**.

Additionally, the top plate 226 may be coupled with one side of the upper case 224. For example, as shown in FIGS. 5 and 9, a plurality of bolts T may be inserted into each of a third fastening groove C3 formed in the top plate 226, a second fastening groove C2 formed in the upper case 224 and a first fastening groove C1 formed in the lower case 222 and fastened using nuts N.

Further, the top plate 226 may have the outlet H2 where gas exits. The outlet H2 may be open such that the inside of the module housing 220 are in communication with the outside. The outlet H2 may be connected to the other end of the gas pipe 230 (the end of the gas movement path, **232*t* in FIG. 5**).

According to this configuration of the present disclosure, the present disclosure includes the top plate 226 configured to cover one side of the receiving space **224*a* of the upper case 224, so the gas pipe 230 may be safely stored in the module housing 220, and when a fire or explosion occurs, produced gas is not allowed to move through the gas pipe 230, and in the event of leaks, gas may be safely received in the receiving space 224*a*. Ultimately, it is possible to increase the safety of the battery module 200**.

Additionally, referring back to FIG. 4, the upper case 224 may include at least one first fixing groove G1. The first fixing groove G1 may be recessed in the inward direction of the body at a part of the upper case 224, and one end **232*b* of the connecting unit 232 in the vertical direction may be inserted into the first fixing groove G1. The first fixing groove G1 may be configured to close one end of the connecting unit 232 in the vertical direction. The first fixing groove G1 may be configured to fix the location of the connecting unit 232**.

Further, referring back to FIG. 10, the top plate 226 may include a second fixing groove G2 into which the other end **232*a* of the connecting unit 232 in the vertical direction is inserted. The second fixing groove G2 may be recessed in the inward direction of the body at a part of the top plate 226. The second fixing groove G2 may be configured to close the other end 232*a* of the connecting unit 232 in the vertical direction. The second fixing groove G2 may be configured to fix the location of the connecting unit 232**.

According to this configuration of the present disclosure, the present disclosure includes the first fixing groove G1 formed in the upper case 224 and the second fixing groove G2 formed in the top plate 226, to fix the location of the connecting unit 232 and close at least one of one end **232*b* or the other end 232*a* of the connecting unit 232 in the vertical direction, so the connecting unit 232** may disperse (absorb) the pressure of the produced gas in the vertical direction, thereby reducing the gas explosive power.

Figure 11:
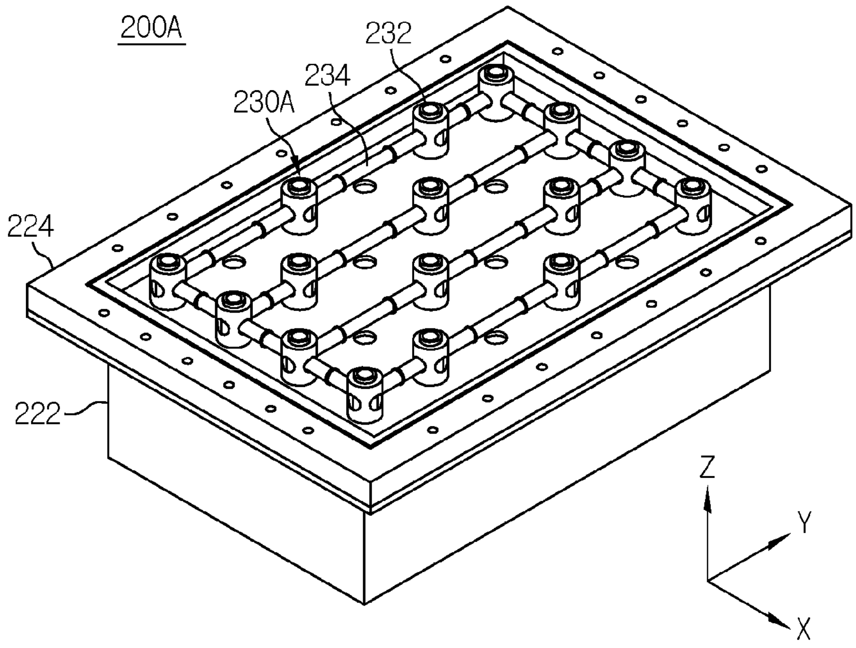
FIG. 11 is a schematic perspective view of components of a battery module according to another embodiment of the present disclosure.

FIG. 11 is a schematic perspective view of the components of a battery module according to another embodiment of the present disclosure.

Referring to FIG. 11 together with FIG. 5, the battery module 200A according to another embodiment of the present disclosure may include a smaller number of connecting units 232 and pipe units 234 for the same length of the gas movement path of the gas pipe 230A as the battery module 200 of FIG. 5. For example, the battery module 200A according to another embodiment of the present disclosure may include a smaller number of connecting units 232 of the gas pipes 230A when compared with the battery module 200 of FIG. 5.

For example, the battery module 200 of FIG. 5 includes 24 connecting units 232, while the gas pipe 230A of FIG. 11 includes 16 connecting units 232. However, the gas pipe 230A of FIG. 11 may have approximately the same total horizontal length in which gas moves as that of FIG. 5. It is because the gas pipe 230A of each of FIGS. 5 and 11 has similar gas release paths.

Compared with the battery module 200 of FIG. 5, when the battery capacity or the gas explosive power is lower, the number of connecting units 232 of the gas pipes 230A may be decreased as in the battery module 200A of FIG. 11. Additionally, as the number of connecting units 232 decreases, the number of pipe units 234 may decrease. The pipe unit 234 having the extended length may be connected to the connecting unit 232.

According to this configuration of the present disclosure, the present disclosure may be configured to adjust the number of connecting units 232 and the number of pipe units 234 of the gas pipes 230A according to the gas explosive power of the at least one cell assembly 210, thereby reducing the number of unnecessary components, reducing the weight of the battery module and saving the manufacturing cost.

Additionally, referring back to FIGS. 6 and 8, the length of the gas pipe 230 may be adjusted according to the gas explosive power of the at least one cell assembly 210. Specifically, the pipe unit 234 may be configured to have an adjustable length.

For example, referring to FIG. 8, the pipe unit 234 may include three pipe portions 234*a*, 234*b*, 234*c*. In FIG. 8, the pipe portion 234*a* disposed on the left side and the pipe portion 234*c* disposed on the right side may have the same diameter. The remaining pipe portion 234*b* disposed at the center may have a smaller diameter than the two pipe portions 234*a*, 234*c*. One part or the other part of the pipe portion 234*b* disposed at the center may be inserted into the left pipe portion 234*a* and the right pipe portion 234*c* respectively.

Accordingly, the present disclosure may, if necessary, increase the length of the pipe unit 234 by pulling the pipe portion 234*b* disposed at the center from the left pipe portion 234*a* and the right pipe portion 234*c*, or may decrease the total length of the pipe unit 234 by inserting the pipe portion 234*b* disposed at the center into the left pipe portion 234*a* and the right pipe portion 234*c*.

According to this configuration of the present disclosure, the present disclosure may adjust the length of the gas pipe 230 according to the gas explosive power of the at least one cell assembly 210, thereby appropriately changing the length and location of the gas pipe 230 according to the explosive power of the battery module 200 or the gas exhaust path.

That is, since the length and location of the gas pipe 230 may be changed according to the size and shape of the battery module 200, the gas pipe 230 may be used as a standardized component. Accordingly, when there are changes of various capacities or shapes of the battery module 200, there is no need to separately manufacture the gas pipe 230, thereby reducing the manufacturing cost.

Figure 12:
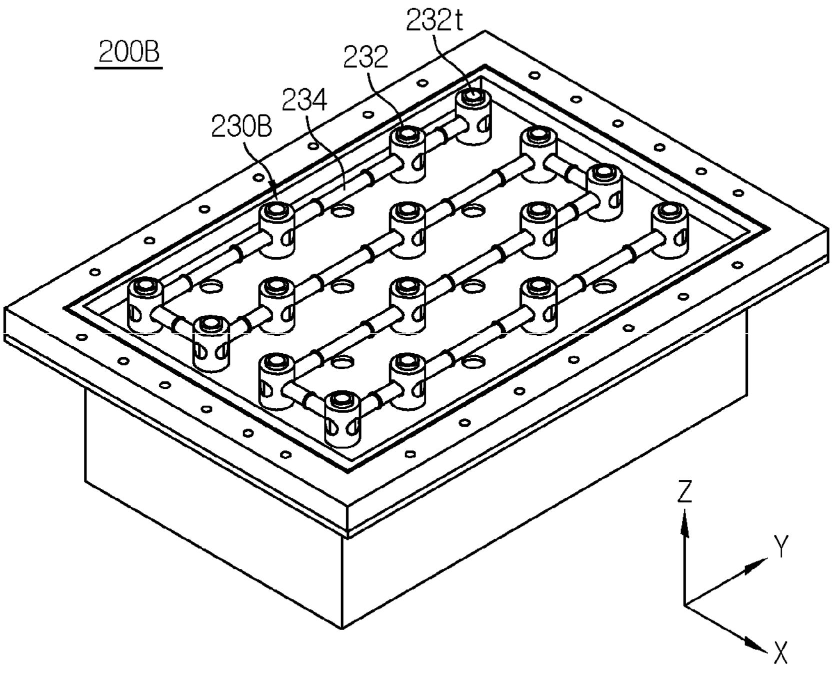
FIG. 12 is a schematic perspective view of components of a battery module according to still another embodiment of the present disclosure.

FIG. 12 is a schematic perspective view of the components of a battery module according to still another embodiment of the present disclosure.

Referring to FIG. 12 together with FIG. 1, when compared with the gas pipe 230A of the battery module 200A of FIG. 11, the battery module 200B of FIG. 12 may have a different location of the end 232*t* of the gas pipe 230B connected with the outlet (not shown) of the top plate 226. For example, as shown in FIG. 12, the end 232*t* of the gas pipe 230B may be configured to be connected with the outlet (not shown) disposed at the rear left side of the top plate 226. Additionally, the gas pipe 230B of FIG. 12 may be configured to have an increased gas movement path in the front-rear direction.

Figure 13:
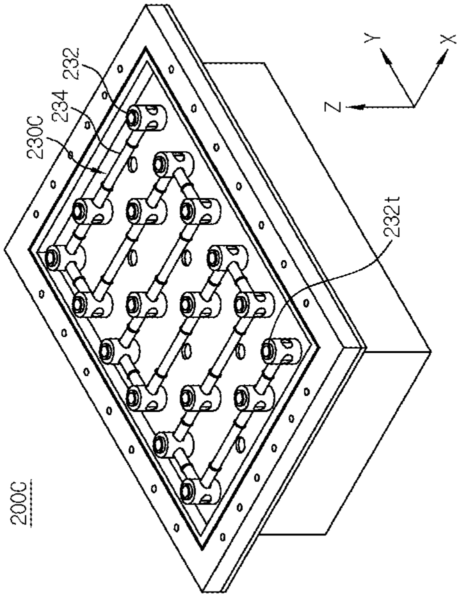
FIG. 13 is a schematic perspective view of components of a battery module according to yet another embodiment of the present disclosure.

FIG. 13 is a schematic perspective view of the components of a battery module according to yet another embodiment of the present disclosure.

Referring to FIG. 13 together with FIG. 1, when compared with the gas pipe 230A of the battery module 200A of FIG. 11, the battery module 200C of FIG. 13 may have a different location of the end 232*t* of the gas pipe 230C connected with the outlet (not shown) formed in the top plate 226. For example, as shown in FIG. 13, the end 232*t* of the gas pipe 230 may be configured to be connected with the outlet (not shown) disposed on the front right side of the top plate 226. Additionally, the gas pipe 230C of FIG. 13 may be configured to have an increased gas movement path in the horizontal direction.

Figure 14:
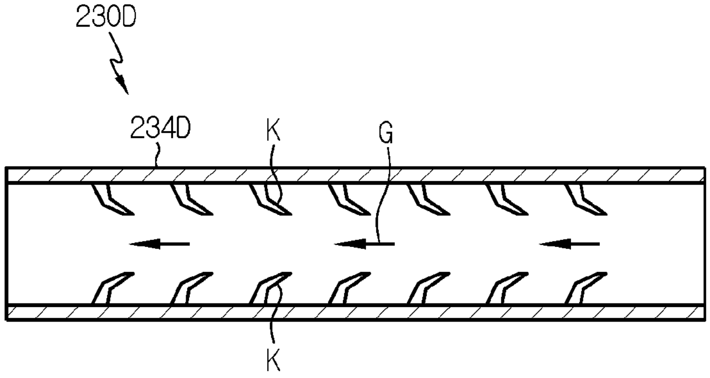
FIG. 14 is a schematic cross-sectional view of the inside of components of a gas pipe of a battery module according to another embodiment of the present disclosure.

FIG. 14 is a schematic cross-sectional view of the inside of the components of a gas pipe of a battery module according to another embodiment of the present disclosure.

Referring to FIG. 14, the pipe unit 234D of the gas pipe 230D of the battery module 200 according to another embodiment of the present disclosure may include a plurality of interruption protrusions K therein. The plurality of interruption protrusions K may be configured to interrupt the movement of gas in the movement space in which gas moves. The plurality of interruption protrusions K may extend at an angle from the inner surface of the pipe unit 234D toward a direction opposite to the gas movement direction G. The plurality of interruption protrusions K may be configured to reduce the gas movement rate by friction with the moving gas.

According to this configuration of the present disclosure, the present disclosure includes the plurality of interruption protrusions K in the gas pipe 230D to reduce the gas movement rate, thereby effectively reducing the gas explosive power released to the outside through the gas pipe 230D. Accordingly, it is possible to effectively enhance the safety of the battery module.

Meanwhile, a battery pack according to an embodiment of the present disclosure includes at least one battery module 200.

Additionally, the battery pack may further include various types of devices (not shown) for controlling the charge/discharge of the battery module 200, for example, a Battery Management System (BMS), a current sensor and a fuse.

Meanwhile, an electronic device (not shown) according to an embodiment of the present disclosure includes at last one battery module 200. The electronic device may further include a device housing (not shown) having a receiving space for receiving the battery pack and a display unit to allow a user to see the state of charge of the battery pack.

Additionally, a vehicle according to an embodiment of the present disclosure may include at least one battery pack. The vehicle may be a vehicle such as an electric vehicle or a hybrid electric vehicle. That is, the vehicle according to an embodiment of the present disclosure may include the battery pack according to an embodiment of the present disclosure mounted in the vehicle body.

Meanwhile, the terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

| [Description of Reference Numerals] | |
|---|---|
| 200: Battery module | 210: Cell assembly |
| 211: Secondary battery | 220: Module housing |
| 222: Lower case | 224: Upper case |
| 226: Top plate | 222a, 224a: Internal space, Receiving space |
| H1, H2: Connection hole, Outlet | |
| 230: Gas pipe | |
| 232: Connecting unit | 234: Pipe unit |
| P: Insertion hole | |
| 240: Sealing member | |
| 241, 242: First sealing portion, Second sealing portion | |
| G1, G2: First fixing groove, Second fixing groove | |
| K: Interruption protrusion | |

What is claimed is:

1. A battery module, comprising:

at least one cell assembly including a plurality of secondary batteries;

a gas pipe configured to allow produced gas to move; and a module housing including:

a lower case having one open side and an internal space in which the at least one cell assembly is received, an upper case coupled to one side of the lower case in a vertical direction to cover the open side of the lower case and having a receiving space in which the gas pipe is received, and a first connection hole formed in the upper case such that the gas pipe and the internal space are in communication with each other, wherein the gas pipe includes:

a first connector extending in the vertical direction, the first connector having a top wall and a sidewall; and a first pipe which extends in a horizontal direction and has a first end releasably connected with the sidewall of the first connector, wherein the first connector is retained in the first connection hole, and wherein the first connector has four insertion holes spaced around a perimeter of the first connector.

2. The battery module according to claim 1, wherein the first connector includes:

an insertion hole in the sidewall into which the first end of the first pipe is inserted, and a sealing member configured to open the insertion hole when the first pipe is inserted into the insertion hole, and close the insertion hole when the first pipe is not inserted into the insertion hole.

3. The battery module according to claim 2, wherein the sealing member includes at least two sealing portions disposed in the insertion hole, wherein the at least two sealing portions are configured to come into contact with each other to close the insertion hole when the first pipe is not inserted into the insertion hole, and wherein the at least two sealing portions are configured to spread apart to open the insertion hole when the end of the first pipe is inserted.

4. The battery module according to claim 1, wherein the upper case has one open side of the receiving space, and wherein the battery module further comprises:

a top plate coupled with the upper case to cover the open side of the receiving space of the upper case, and having an outlet connected with the gas pipe to release gas to outside.

5. The battery module according to claim 4, wherein the upper case includes a first fixing groove recessed in an inward direction, into which the first connector is inserted, and the top plate includes a second fixing groove recessed in the inward direction, into which a second end of the first connector in the vertical direction is inserted.

6. The battery module according to claim 1, wherein the gas pipe is configured to have an adjustable length according to gas explosive power of the at least one cell assembly.

7. The battery module according to claim 6, wherein the gas pipe includes a plurality of interruption protrusions configured to interrupt movement of gas in a movement space in which the gas moves.

8. A battery pack comprising at least one battery module according to claim 1.

9. A vehicle comprising at least one battery pack according to claim 8.

10. The battery module according to claim 1, wherein the upper case has a first fixing groove recessed in an inward direction into which a first end of the first connector is inserted in a vertical direction.

11. The battery module according to claim 1, wherein a second end of the first pipe releasably connects to a sidewall of a second connector extending from a second connection hole formed in the upper case.

12. The battery module according to claim 1, further comprising a second pipe connected to the sidewall of the first connector.

13. The battery module according to claim 12, wherein the second pipe is perpendicular to the first pipe.

14. The battery module according to claim 1, wherein the first connection hole extends in the vertical direction.

15. The battery module according to claim 1, wherein the first connector is a cylinder having a single sidewall.

* * * * *